(12) United States Patent
Shahar et al.

(10) Patent No.: US 11,665,628 B2
(45) Date of Patent: *May 30, 2023

(54) MECHANISM TO IMPROVE BLUETOOTH CONNECTION TIME IN THE PRESENCE OF ACTIVE CELLULAR OR WIFI TRAFFIC

(71) Applicant: Intel Corporation, Santa Clara, CA (US)

(72) Inventors: Itzik Shahar, Kadima (IL); Daniel Cohn, Raanana (IL); Hakan Magnus Eriksson, Portland, OR (US); Oren Shalita, Tel-Aviv (IL)

(73) Assignee: Intel Corporation, Santa Clara, CA (US)

( * ) Notice: Subject to any disclaimer, the term of this patent is extended or adjusted under 35 U.S.C. 154(b) by 394 days.

This patent is subject to a terminal disclaimer.

(21) Appl. No.: 16/820,432

(22) Filed: Mar. 16, 2020

(65) Prior Publication Data
US 2020/0221375 A1   Jul. 9, 2020

Related U.S. Application Data

(63) Continuation of application No. 16/193,205, filed on Nov. 16, 2018.

(51) Int. Cl.
| | |
|---|---|
| *H04W 48/00* | (2009.01) |
| *H04W 48/16* | (2009.01) |
| *H04L 69/18* | (2022.01) |
| *H04W 76/14* | (2018.01) |
| *H04W 88/06* | (2009.01) |

(52) U.S. Cl.
CPC ............. *H04W 48/16* (2013.01); *H04L 69/18* (2013.01); *H04W 76/14* (2018.02); *H04W 88/06* (2013.01)

(58) Field of Classification Search
CPC ..... H04W 48/16; H04W 76/14; H04W 88/06; H04L 69/18
See application file for complete search history.

(56) References Cited

U.S. PATENT DOCUMENTS

| | | | |
|---|---|---|---|
| 2013/0058314 A1* | 3/2013 | Broise ................. | H04W 72/082 370/336 |
| 2016/0234749 A1* | 8/2016 | Singh .................... | H04W 48/02 |

* cited by examiner

*Primary Examiner* — Pakee Fang
(74) *Attorney, Agent, or Firm* — Alliance IP, LLC

(57) ABSTRACT

An apparatus of a wireless system, product to be implemented at a computer process of the wireless system, and method to operate the apparatus. The apparatus includes an input; an output; and processing circuitry connected to the input and to the output, the processing circuitry to implement logic to: receive, through the input and from a first modem of the wireless system, information on a traffic attribute relating to communication in compliance with a first wireless communication protocol; determine, based on the traffic attribute, blacklisted channels to be avoided during a discovery procedure by a second modem of the wireless system, the discovery being in compliance with a second wireless communication protocol; and send, through the output, information based on the blacklisted channels to the second modem to cause the second modem to avoid the blacklisted channels during the discovery procedure.

25 Claims, 6 Drawing Sheets

MECHANISM TO IMPROVE BLUETOOTH CONNECTION TIME IN THE PRESENCE OF ACTIVE CELLULAR OR WIFI TRAFFIC

REFERENCE TO RELATED APPLICATION

This application is a continuation (and claims the benefit of priority under 35 U.S.C. § 120) of U.S. patent application Ser. No. 16/193,205 filed on Nov. 16, 2018, entitled A MECHANISM TO IMPROVE BLUETOOTH CONNECTION TIME IN THE PRESENCE OF ACTIVE CELLULAR OR WIFI TRAFFIC, the entire contents of which are incorporated by reference herein.

TECHNICAL FIELD

The instant disclosure generally relates to the coexistence of Bluetooth (BT) with wireless communication such as in WiFi and/or in cellular networks.

BACKGROUND

Communication systems typically operate in accordance with one or more communication standards. Wireless communication systems may operate in accordance with one or more standards including, but not limited to, Institute of Electrical and Electronics Engineers (IEEE) 802.11, WiFi Direct, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), time division multiple access (TDMA) systems, frequency division multiple access (FDMA) systems, 3GPP Long Term Evolution (LTE) systems, and orthogonal frequency division multiple access (OFDMA) systems.

Some advanced devices include multiple radios for trans-mitting/receiving using different Radio Access Technologies (RATs). Examples of RATs include, e.g., Universal Mobile Telecommunications System (UMTS), Global System for Mobile Communications (GSM), cdma2000, WiMAX, WiFi (e.g., WiFi), Bluetooth, LTE, and the like.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
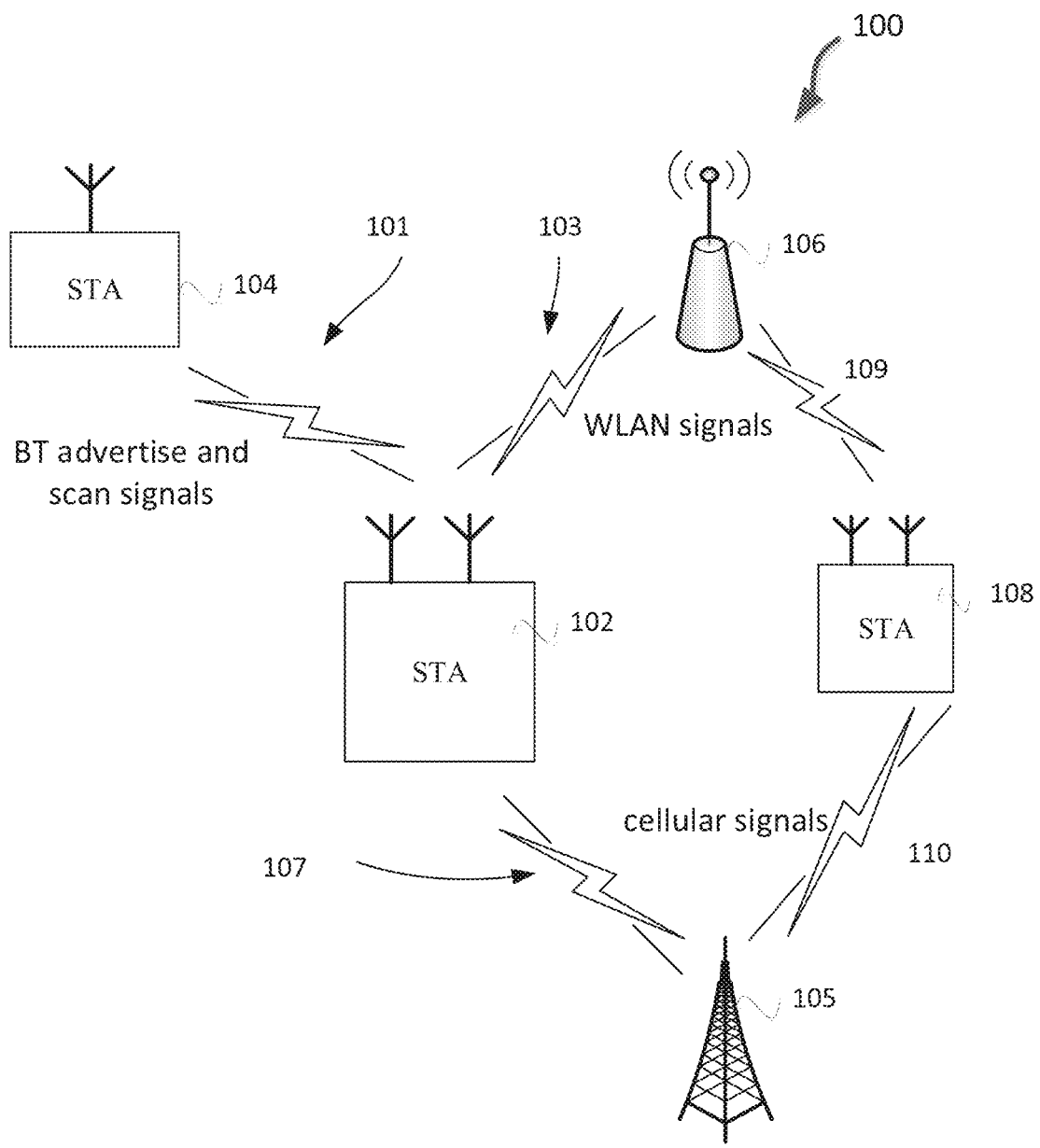
FIG. 1 is a diagram of an example environment for Bluetooth coexistence with other wireless communication protocols such as WiFi and/or cellular protocols.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units, and/or circuits have not been described in detail so as not to obscure the discussion.

Discussions herein utilizing terms such as, for example, "processing," "computing," "calculating," "determining," "establishing," "analyzing," "checking," or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality," as used herein, include, for example, "multiple" or "two or more." For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

As used herein, "baseband processing circuitry" and "modem" are used interchangeably.

Embodiments address problems that may arise from col-located technology interfaces on a given wireless system, such as a station (STA), an access point (AP), a user equipment (UE), a base station, a mobile device or other wireless system. The collocated technology interfaces may include Bluetooth (BT) compliant radio architectures, and, in addition, other radio architectures such as a Wireless Local Area Network (WiFi) and/or cellular (e.g. Long Term Evolution (LTE) or New Radio (NR)) radio architectures. In such wireless communication systems, there is a potential for mutual interference between such radio architectures.

By way of example, a BT radio architecture and a WiFi and/or cellular radio architecture in the same wireless system, regardless of whether or not such architectures are on the same chip or on different chips, may interfere with one another during operation in the radio frequency (RF) domain, such as during WiFi transmissions in the 2.4 GHz band and/or during cellular transmissions on Time Division Duplex (TDD) or Frequency Division Duplex (FDD) bands close to 2.4 GHz. The interference with BT communications may be caused either by actual WiFi/cellular or other non- BT wireless traffic in the BT channels, or by energy spillover from non-BT wireless traffic adjacent to the BT channels. The WiFi or cellular radio architectures may sometimes simply prevent each other from operating properly, since, as the baseband architectures/processing circuitries for each of BT, WiFi and cellular communications may not support simultaneous transmission and reception, performance while BT is operating at the same time as either WiFi or cellular communication may be less robust than if the respective radio architectures were operating separately from each other in the time domain It could be, for example, that a single transmitter amplifier is used for the BT and WiFi communications, which would make simultaneous transmit and receive as between WiFi and BT physically not possible. Where the transmit and receive chains use the same RF plane, where simultaneous transmit and receive may be possible, performance may be degraded by virtue for example of having to use a lower transmit power.

With respect to BT communication, a BT connection relies on a discovery procedure including scanning for BT signals on the air medium, or advertising by causing transmission of BT advertising packets over the air medium. In particular, a flow referred to in the art as "PAGE, INQUIRY" for classic BT, and "LE SCAN" for BT Low Energy or BLE, involves a first BT compliant wireless system transmits advertising packets on a plurality of frequencies within predefined BT channels. Advertising events per the BT 5.0 specification (BLE) for example use any number of channels from three predefined primary advertising channels, and may also use any number of secondary channels for the advertising packets. The channels used for the advertising packets may be referred to as advertising channels. A second BT compliant wireless system then scans for signals on the advertising channels, and were it meets an advertising packet for the first BT compliant wireless system, establishes a BT connection with the second BT compliant wireless system.

When scanning, a Link Layer of the second BT compliant wireless system listens on the primary advertising channel. There are two types of scanning possible per Bluetooth SIG's BT 5.0 standard, passive and active. During scanning, the second BT compliant wireless system listens on a primary advertising channel index for the duration of a scan window, designated "scanWindow." In addition, a scan interval, designated "scan Interval," is defined in BT 5.0 as the interval between the start of two consecutive scan windows. The second BT compliant wireless system should listen for the complete scanWindow every scanInterval unless there is a scheduling conflict. In each scan window, the second BT compliant wireless system should scan on a different primary advertising channel index. The BT compliant wireless system shall use all the primary advertising channel indices. Thus, the second BT compliant wireless system scans all frequencies/channels from a predetermined pool and chooses, for a given scan interval time period, one of the frequencies/channels from the pool to listen for advertising packets. The second BT compliant wireless system can jump between frequencies when scanning A BT connection may be established after the first BT compliant wireless system and the second BT compliant wireless system meet in the same frequency channel (that is, when the second BT compliant wireless system scans and find an advertising packet from the first BT compliant wireless system on a given frequency/channel).

Keeping the advertising and scanning regime described above, in coexistence scenarios where two types of wireless signals, such as BT wireless signals and WiFi and/or cellular wireless signals, occupy part of the 2.4 GHz bandwidth, communication based on such signals can suffer from high error rates because of interference/collisions between BT signals on the one hand, and one or more of WiFi and cellular signals in the 2.4 GHz bandwidth on the other hand. In particular, when a BT radio architecture makes an attempt at a BT connection, for example using discovery including advertising or scanning, in the presence of WiFi/cellular traffic, the BT radio architecture that is scanning will be incapable of decoding signals in channels "contaminated" by the collocated non-BT radio architectures, such as WiFi or cellular radio architectures (i.e. using simultaneously same/adjacent frequency/channels for air activity). Therefore, if the BT radio architecture is advertising and/or scanning in contaminated channels, the time duration to establish a BT connection may increase significantly due to the time wasted in advertising and scanning on these "contaminated" channels. A "contaminated channel" is defined herein as an air channel on which non-BT traffic exists at bandwidths within the range of BT compliant communication.

According to embodiments, a BT radio architecture may be enabled to advertise and scan only non-contaminated channels, that is, on channels where no wireless traffic exists or is expected to exist that would interfere with BT traffic. Enablement of a BT radio architecture in the above manner would result in faster connection times, since the BT radio architecture would spend its time listening to the "clean" or non-contaminated frequencies instead of listening to both clean and contaminated channels, thus bringing about faster BT connection times as compared with the state of the art.

Embodiments achieve the above advantages by making available to any part of the BT radio architecture, for example to the BT baseband processing circuitry, information about collocated technology traffic characteristics, such as, for example, information regarding contaminated channels, a given channel's activity ratio (e.g. % active), the ratio of transmit power to receive power for a given channel, to name a few. In a given wireless system, information regarding contaminated channels may be shared with the BT radio architecture, such as with the BT baseband processing circuitry of the BT radio architecture, by inter-chip or intra-chip communication with the BT radio architecture. Armed with information regarding the contaminated channels, the BT radio architecture can avoid contaminated channels during BT connection set up. The above holds true even if a peer wireless system with which the given wireless system is seeking to establish a BT connection is agnostic with respect to the mechanism being used by the given wireless system to optimize BT connection times.

Some embodiments may be used in conjunction with various devices and systems—for example, user equipment (UE), a mobile device (MD), a wireless station (STA), a personal computer (PC), a desktop computer, a mobile computer, a laptop computer, a notebook computer, a tablet computer, a server computer, a handheld computer, a handheld device, an Internet of Things (IoT) device, a sensor device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WiFi), a Personal Area Network (PAN), a Wireless PAN (WPAN), and the like.

Some embodiments may be used in conjunction with devices and/or networks operating in accordance with existing Institute of Electrical and Electronics Engineers (IEEE) 802.11 standards or protocols, including IEEE 802.11-2012, ("IEEE Standard for Information technology—Telecommunications and information exchange between systems Local and metropolitan area networks—Specific requirements Part 11: Wireless LAN Medium Access Control (MAC) and Physical Layer (PHY) Specifications," Mar. 29, 2012); IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz," December 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band," 28 Dec. 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); and/or IEEE 802.11az (IEEE 802.11az, Next Generation Positioning), and/or future versions and/or derivatives thereof, devices and/or networks operating in accordance with existing WiFi Alliance (WFA) specifications (including WiFi Neighbor Awareness Networking (NAN) Technical Specification, Version 1.0, May 1, 2015) and/or future versions and/or derivatives thereof, devices and/or networks operating in accordance with existing WFA Peer-to-Peer (P2P) specifications (including WiFi P2P technical specification, version 1.5, Aug. 4, 2014) and/or future versions and/or derivatives thereof, devices and/or networks operating in accordance with existing Wireless-Gigabit-Alliance (WGA) specifications (including Wireless Gigabit Alliance, Inc. WiGig MAC and PHY Specification Version 1.1, April 2011, Final specification) and/or future versions and/or derivatives thereof, devices and/or networks operating in accordance with existing cellular specifications and/or protocols, e.g., 3rd Generation Partnership Project (3GPP), 3GPP Long-Term Evolution (LTE) and/or future versions and/or derivatives thereof, units and/or devices which are part of the above networks, and the like.

Some embodiments may be used to communicate in one-way and/or two-way radio communication systems, cellular radio-telephone communication systems, a mobile phone, a cellular telephone, a wireless telephone, a Personal Communication Systems (PCS) device, a PDA device that incorporates a wireless communication device, a mobile or portable global positioning system (GPS) device, a device that incorporates a GPS receiver or transceiver or chip, a device that incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device—for example, a smartphone—a Wireless Application Protocol (WAP) device, or the like.

Some embodiments may be used to communicate one or more types of wireless communication signals or protocols, for example, radio frequency (RF), infrared (IR), frequency-division multiplexing (FDM), orthogonal FDM (OFDM), orthogonal frequency-division multiple access (OFDMA), FDM time-division multiplexing (TDM), time-division multiple access (TDMA), multi-user MIMO (MU-MIMO), spatial division multiple access (SDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), WiFi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long-Term Evolution (LTE), LTE advanced, Enhanced Data rates for GSM Evolution (EDGE), or the like. Other embodiments may be used in various other devices, systems, and/or networks.

The term "wireless communication device," as used herein, includes, for example, a portable or non-portable device capable of wireless communication. In some demonstrative embodiments, a wireless communication device may be or may include a peripheral device that is to be integrated with a computer, or a peripheral that is to be attached to a computer. The term "wireless communication device," as used herein, may include, for example, a smallest chip or integrated circuit that may provide a given described functionality. The term "wireless communication device" may for example include a baseband processing circuitry, or a wireless communication system, or "wireless system" encompassing the baseband processing circuitry and more components, such as a radio integrated circuit, a radio front-end module, and/or antennas.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a receiver to receive the communication signal from at least one other communication unit such as an AP or a STA. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used to communicate in a WiFi—for example, a WiFi network. Other embodiments may be used in conjunction with any other suitable wireless communication network—for example, a wireless area network, a "piconet," a WPAN, a WVAN, and the like.

Some demonstrative embodiments may be used to communicate over a frequency band of 2.4 GHz or 5 GHz, and/or a frequency band, such as for WiFi communications. However, other embodiments may be implemented utilizing any other suitable wireless communication frequency bands—for example, a sub 1 GHz (S1G) frequency band, an Extremely High Frequency (EHF) band (the millimeter wave (mmWave) frequency band, such as a frequency band within the frequency band of between 20 Ghz and 300 GHZ, such as the 60 Ghz frequency band), WiFi frequency bands, WPAN frequency bands, and the like.

As used herein, the term "circuitry" may refer to, be part of, or include, an Application Specific Integrated Circuit (ASIC), an integrated circuit, an electronic circuit, a processor (shared, dedicated, or group) circuitry, and/or memory circuitry (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware (e.g., silicon blocks of various chips and/or processors). Logic may be included in, and/or implemented as part of, various circuitry (e.g. radio circuitry, receiver circuitry, control circuitry, transmitter circuitry, transceiver circuitry, processor circuitry, or the like). In one example, logic may be embedded in volatile memory and/or non-volatile memory, including random access memory, read-only memory, programmable memory, magnetic memory, flash memory, persistent memory, and the like. Logic may be executed by one or more processors using memory (e.g., registers, buffers, stacks, and the like) coupled to the one or more processors, e.g., as necessary to execute the logic. The term "antenna," as used herein, may include any suitable configuration, structure, and/or arrangement of one or more antenna elements, components, units, assemblies, and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, or the like.

FIG. 1 is a diagram of an example environment including a wireless network 100 that accommodates BT communication, and further non-BT communication, such as WiFi and cellular communication. Network 100 includes respective wireless systems in the form of STA 102, STA 104, STA 108, AP 106 and base station 105. In the shown network, STA 102 includes BT functionality, and, in addition, non-BT wireless functionality including WiFi and cellular functionality. As shown, STA 102 is configured to perform the afore-described discovery procedure including advertise and scan procedure 101 to establish a BT connection between STA 102 and STA 104. STA 102 is also shown as being in WiFi communication 103 with AP 106, and in cellular communication 107 with base station 105. In addition, STA 108 is shown as conducting WiFi communication 109 with AP 106 and cellular communication 110 with base station 105.

Using current techniques, STA 102's BT baseband processing circuitry would be performing a advertise and scan procedure with its BT peer STA 104 on a number of channels within a predetermined pool of channels, as explained above for example in relation to BT 5.0, or in accordance with classic BT by systematically hopping across a set number of channels in a set order in a well-known manner The advertising and scanning could, according to the state of the art, take place on some frequencies on the 2.4 GHz bands that are contaminated with non-BT wireless communications in bands that would interfere with BT communications. For example, the BT discovery procedure (advertise and scan procedure) 101 may take place on one or more frequencies on which one of WiFi communications 103 or 109 or cellular communications 107 or 110 take place. BT discovery procedures that use contaminated channels, as explained above, would result in longer connection times/longer discovery times for establishing BT connection between STA 102 and STA 104, in this way adversely degrading the performance of network 100.

In some demonstrative embodiments, the wireless medium may include, for example, a radio channel, an RF channel, a Wireless Fidelity (WiFi) channel, a cellular channel, an IR channel, a Low Power Wake-Up channel, and the like. One or more elements of ESS 100 may optionally be capable of communicating over any suitable wired communication links.

In some demonstrative embodiments, a STA within a wireless network may include, for example, user equipment (UE), a mobile device (MD), a WiFi STA, a mobile computer, a laptop computer, an Internet of Things (IoT) device, a sensor device, a notebook computer, a tablet computer, an Ultrabook™ computer, a mobile internet device, a handheld computer, a handheld device, a PDA device, a handheld PDA device, an on-board device, an off-board device, a hybrid device (e.g., combining cellular phone functionalities with PDA device functionalities), a consumer device, a mobile or portable device, a mobile phone, a cellular telephone, a PCS device, a PDA device that incorporates a wireless communication device, a mobile or portable GPS device, a relatively small computing device, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Personal Media Player (PMP), a digital video camera (DVC), a gaming device, a smartphone, or the like.

In some demonstrative embodiments, one or more of the plurality of STAs may include, may perform a role of, and/or may perform the functionality of, an access point (AP) station (STA), or of a non-AP STA.

In one example, STA may include a logical entity that is a singly addressable instance of a medium access control (MAC) and physical layer (PHY) interface to the wireless medium. The STA may perform any other additional or alternative functionality.

In one example, an AP may include an entity that contains a STA, and provides access to distribution services, via the wireless medium for associated STAs. The AP may perform any other additional or alternative functionality, and may be wired to a router, or may be an integral part of a router, to provide connection to a network.

In one example, a non-AP STA may include a STA that is not contained within an AP. The non-AP STA may perform any other additional or alternative functionality.

The non-AP STA may perform any other additional or alternative functionality.

Figure 2:
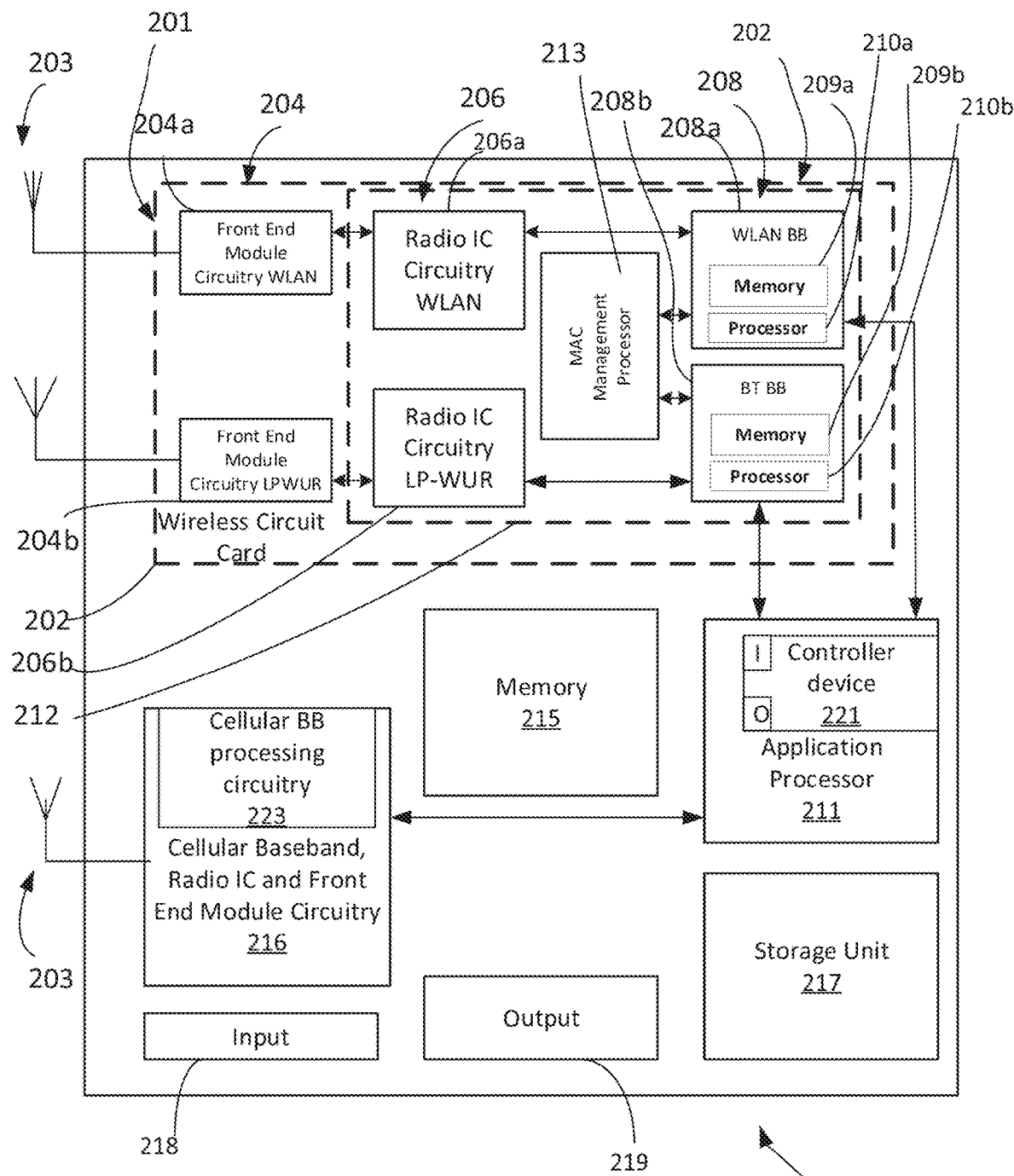
FIG. 2 is a simplified block diagram of an example wireless communication system according to one embodiment.

When referring to FIG. 2, it is noted that the figure depicts one embodiment of a STA, such as STA 102 of FIG. 1, or one embodiment of an AP, such as AP 106 of FIG. 1, as would be recognized by a skilled person, although embodiments are not so limited. At certain points within the below description, therefore, FIG. 2 will be referred to as a wireless communication system including an architecture for a STA 200, although the description herein retain equally as well to the AP 200.

Referring next to FIG. 2, a block diagram is shown of a wireless communication system such as a STA 200 or an AP 200, such as any of STA1, STA2 or AP 106, according to some demonstrative embodiments. The shown wireless communication station includes a wireless communication radio architecture 201 in accordance with some embodiments. Radio architecture 201 may include radio front-end module (FEM) circuitry 204, radio integrated circuit (IC) circuitry 206, and baseband processing circuitry 208. Radio architecture 201 as shown includes both Wireless Local Area Network (WiFi) functionality and Bluetooth (hereinafter designated as "BT," and including functionality in compliance with any one of the Bluetooth standards such as classic BT or BT Low Energy or BLE) functionality, although embodiments are not so limited. In this disclosure, "WiFi" and "Wi-Fi" are used interchangeably. BT refers to medium access control layer (MAC) and physical layer (PHY) specifications in accordance with efforts within the Bluetooth Special Interest Group (BT SIG). BT operates in general in the 2400-2485 MHz range within the Industrial, Scientific and Medical (ISM) 2.4 GHz frequency band. In BT, data is split into packets and exchanged through one of 79 designated Bluetooth channels (each of which have 1 MHz in bandwidth).

In the shown FIG. 2, the WiFi and BT FEM, radio integrated circuits and antennas are shown as being distinct from one another. However, embodiments encompass any configuration of the WiFi and BT architecture, including instances where the transmit and receive chains are shared between WiFi and BT.

FEM circuitry 204 as shown may include a WiFi or Wi-Fi FEM circuitry 204a and a BT FEM circuitry 204b. The WiFi FEM circuitry 204a may include a receive signal path comprising circuitry configured to operate on WiFi RF signals received from one or more antennas 203, to amplify the received signals and to provide the amplified versions of the received signals to the WiFi radio IC circuitry 206a for further processing. The BT FEM circuitry 204b may include a receive signal path that may include circuitry configured to operate on WU RF signals received from one or more antennas 203, to amplify the received signals and to provide the amplified versions of the received signals to the BT radio IC circuitry 206b for further processing. FEM circuitry 204a may also include a transmit signal path that may include circuitry configured to amplify WiFi signals provided by the radio IC circuitry 206a for wireless transmission by one or more of the antennas 203. The BT signal path as shown may include a transmit signal path in the same manner In the embodiment of FIG. 2, as previously noted, although WiFi or Wi-Fi FEM circuitry 204a and BT FEM circuitry 204b are shown as being distinct from one another, and connected to respective distinct antennas, embodiments are not so limited, and include within their scope the use of an FEM (not shown) that includes a transmit path and/or a receive path for WiFi and BT signals, or the use of one or more FEM circuitries or one or more antennas where at least some of the FEM circuitries and antennas share transmit and/or receive signal paths for WiFi and BT signals.

Radio IC circuitry 206 as shown may include WiFi radio IC circuitry 206a and BT radio IC circuitry 206b. The WiFi radio IC circuitry 206a may include a receive signal path that may include circuitry to down-convert WiFi RF signals received from the FEM circuitry 204a and provide baseband signals to WiFi baseband processing circuitry 208a. BT radio IC circuitry 206b may in turn include a receive signal path that may include circuitry to down-convert BT RF signals received from the FEM circuitry 204b and provide baseband signals to BT baseband processing circuitry 208b. WiFi radio IC circuitry 206a may also include a transmit signal path that may include circuitry to up-convert WiFi baseband signals provided by the WiFi baseband processing circuitry 208a and provide WiFi RF output signals to the FEM circuitry 204a for subsequent wireless transmission by the one or more antennas 203. In the embodiment of FIG. 2, as noted previously, although radio IC circuitries 206a and 206b are shown as being distinct from one another, embodiments are not so limited, and include within their scope the use of a radio IC circuitry (not shown) that includes a transmit signal path and/or a receive signal path for both WiFi and BT signals, or the use of one or more radio IC circuitries where at least some of the radio IC circuitries share transmit and/or receive signal paths for both WiFi and BT signals.

Baseband processing circuitry 208 may include a WiFi baseband processing circuitry 208a and a BT baseband processing circuitry 208b. The WiFi baseband processing circuitry 208a may include a memory 209a, such as, for example, a set of RAM arrays in a Fast Fourier Transform or Inverse Fast Fourier Transform block (not shown) of the WiFi baseband processing circuitry 208a. Each of the WiFi baseband processing circuitry 208a and the BT baseband processing circuitry 208b may further include a memory 209b similar to memory 209a described above, and one or more respective processors 210a and 210b including control logic to process the signals received from the corresponding WiFi or BT receive signal path of the radio IC circuitry 206. WiFi baseband processing circuitry 208a is configured to also generate corresponding WiFi baseband signals for the transmit signal path of the radio IC circuitry 206. BT baseband processing circuitry 208b is configured to also generate corresponding BT baseband signals for the transmit signal path of the radio IC circuitry 206. Each of the baseband processing circuitries 208a and 208b may further include physical layer (PHY) and medium access control layer (MAC) circuitry, and may further interface with application processor 211 for generation and processing of the baseband signals and for controlling operations of the radio IC circuitry 206. According to some embodiments, the baseband processing circuitries 208a and 208b could be integrated into a single circuitry, with one baseband circuitry fulfilling both WiFi and BT functionalities.

Referring still to FIG. 2, according to the shown embodiment, a MAC management processor 213 may include a processor having logic to provide a number of higher MAC functionalities, such as, for example, signaling the BT radio architecture including the BT baseband processing circuitry, BT radio IC circuitry and BT FEM and antennas, to scan for discovery of other BT enabled devices that the BT architecture could connect to. In the alternative, or in conjunction with the MAC management processor 213, some of the higher-level MAC functionalities above may be provided by controller circuitry that is part of the application processor 211, or by a controller (not shown) distinct from the application processor 211 and MAC management processor 213. In addition, although the antennas 203 are depicted as being respectively connected to the WiFi FEM circuitry 204a and the BT FEM circuitry 204b, embodiments include within their scope the sharing of one or more antennas as between the WiFi and BT FEMs, or the provision of more than one antenna connected to each of FEM circuitry 204a or 204b.

In some embodiments, the front-end module circuitry 204, the radio IC circuitry 206, and baseband processing circuitry 208 may be provided on a single radio card, such as wireless radio card 202. In some other embodiments, the one or more antennas 203, the FEM circuitry 204, and the radio IC circuitry 206 may be provided on a single radio card. In some other embodiments, the radio IC circuitry 206 and the baseband processing circuitry 208 may be provided on a single chip or integrated circuit (IC), such as IC 212, although embodiments are not so limited.

In some embodiments, the radio architecture 201 may also include other radio cards, such as a cellular radio card 216 configured for cellular (e.g., 3GPP such as LTE, LTE-Advanced, or 5G communications). The cellular radio card 216 may include a cellular baseband processing circuitry 223, a cellular radio IC circuitry and a cellular FEM, the FEM connected to one or more antennas for cellular communication.

The cellular radio card 216, the WiFi system including WiFi baseband processing circuitry 208a, WiFi radio IC circuitry 206a, and WiFi FEM 204a, and the BT architecture including BT baseband processing circuitry 208b, BT radio IC circuitry 206b and BT FEM 204b are shown as being connected to the application processor 211 in order to allow the application processor to control such systems with the higher layer MAC functionality as will be explained in further detail below. For example, controller circuitry, such as controller circuitry within the application processor 213, may be used to control each of the baseband processing circuitries for the cellular, WiFi and BT architectures.

In some embodiments, the wireless radio card 202 may include a WiFi radio card and may be configured for WiFi communications, although the scope of the embodiments is not limited in this respect. In some of these embodiments, the radio architecture 201 may be configured to receive and transmit orthogonal frequency division multiplexed (OFDM) or orthogonal frequency division multiple access (OFDMA) communication signals over a multi-carrier communication channel. The OFDM or OFDMA signals may comprise a plurality of orthogonal subcarriers.

In some of these multi-carrier embodiments, radio architecture 201 may be part of a WiFi communication STA, a wireless AP, a base station, or a mobile device including a WiFi device. In some of these embodiments, radio architecture 201 may be configured to transmit and receive signals in accordance with specific communication standards and/or protocols, such as any of the Institute of Electrical and Electronics Engineers (IEEE) standards, including 802.11n-2009, IEEE 802.11-2012, 802.11n-2009, 802.11ac, and/or 802.11ax standards and/or proposed specifications for WIFI's, although the scope of embodiments is not limited in this respect. Radio architecture 201 may also be suitable to transmit and/or receive communications in accordance with other techniques and standards.

In some embodiments, the radio architecture 201 may be configured for high-efficiency WiFi (HEW) communications in accordance with the IEEE 802.11ax standard, or with the Extremely High Throughput (EHT) developing standard. In these embodiments, the radio architecture 201 may be configured to communicate in accordance with an OFDMA technique, although the scope of the embodiments is not limited in this respect. In some embodiments, the radio architecture 201 may be configured to communicate in accordance with Long Term Evolution (LTE) and/or New Radio sets of standards, including $2^{nd}$, $3^{rd}$, $4^{th}$, $5^{th}$ or next generation cellular standards (2G, 3G, 4G, 5G and next generation).

In some other embodiments, the radio architecture 201 may be configured to transmit and/or receive signals transmitted using one or more other modulation techniques, such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, and On-Off Keying (OOK), although the scope of the embodiments is not limited in this respect.

In some IEEE 802.11 embodiments, the radio architecture 201 may be configured for communication over various channel bandwidths including bandwidths having center frequencies of 900 MHz, 2.4 GHz, 5 GHz, and bandwidths of less than 5 MHz, or of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths), or any combination of the above frequencies or bandwidths, or any frequencies or bandwidths between the ones expressly noted above. In some embodiments, a 320 MHz channel bandwidth may be used. The scope of the embodiments is not limited with respect to the above center frequencies, however.

Referring still to FIG. 2, in some demonstrative embodiments, STA 200 may further include an input unit 218, an output unit 219, and a memory unit 215. STA 200 may optionally include other suitable hardware components and/or software components. In some demonstrative embodiments, some or all of the components of STA 200 may be enclosed in a common housing or packaging, and may be interconnected or operably associated using one or more wired or wireless links. In other embodiments, components of STA 200 may be distributed among multiple or separate devices. It is noted that the exemplary architecture of STA 200 as shown in FIG. 2 and as described above may further be used as part of an architecture for any access points according to some demonstrative embodiments.

In some demonstrative embodiments, application processor 211 may include, for example, a central processing unit (CPU), a digital signal processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an integrated circuit (IC), an application-specific IC (ASIC), or any other suitable multi-purpose or specific processor or controller. Application processor 211 may execute instructions, for example, of an operating system (OS) of STA 200 and/or of one or more suitable applications.

In some demonstrative embodiments, input unit 218 may include, for example, one or more input pins on a circuit board, a keyboard, a keypad, a mouse, a touch-screen, a touch-pad, a track-ball, a stylus, a microphone, or other suitable pointing device or input device. Output unit 219 may include, for example, one or more output pins on a circuit board, a monitor, a screen, a touch-screen, a flat panel display, a light-emitting diode (LED) display unit, a liquid crystal display (LCD) display unit, a plasma display unit, one or more audio speakers or earphones, or other suitable output devices.

In some demonstrative embodiments, memory unit 215 may include, for example, a random-access memory (RAM), a read-only memory (ROM), a dynamic RAM (DRAM), a synchronous DRAM (SD-RAM), a flash memory, a volatile memory, a non-volatile memory, a cache memory, a buffer, a short-term memory unit, a long-term memory unit, or other suitable memory units. Storage unit 217 may include, for example, a hard disk drive, a floppy disk drive, a compact disk (CD) drive, a CD-ROM drive, a DVD drive, or other suitable removable or non-removable storage units. Memory unit 215 and/or storage unit 217, for example, may store data processed by STA 200.

As used below, "at least one of" a given set or list of items connected with "and" is mentioned herein, what is meant is a reference to either one of the noted items or any combination of the items. For example, as used herein, "at least one of A, B, and C" means A, or B, or C, or A and B, or A and C, or B and C, or A and B and C.

Figure 3:
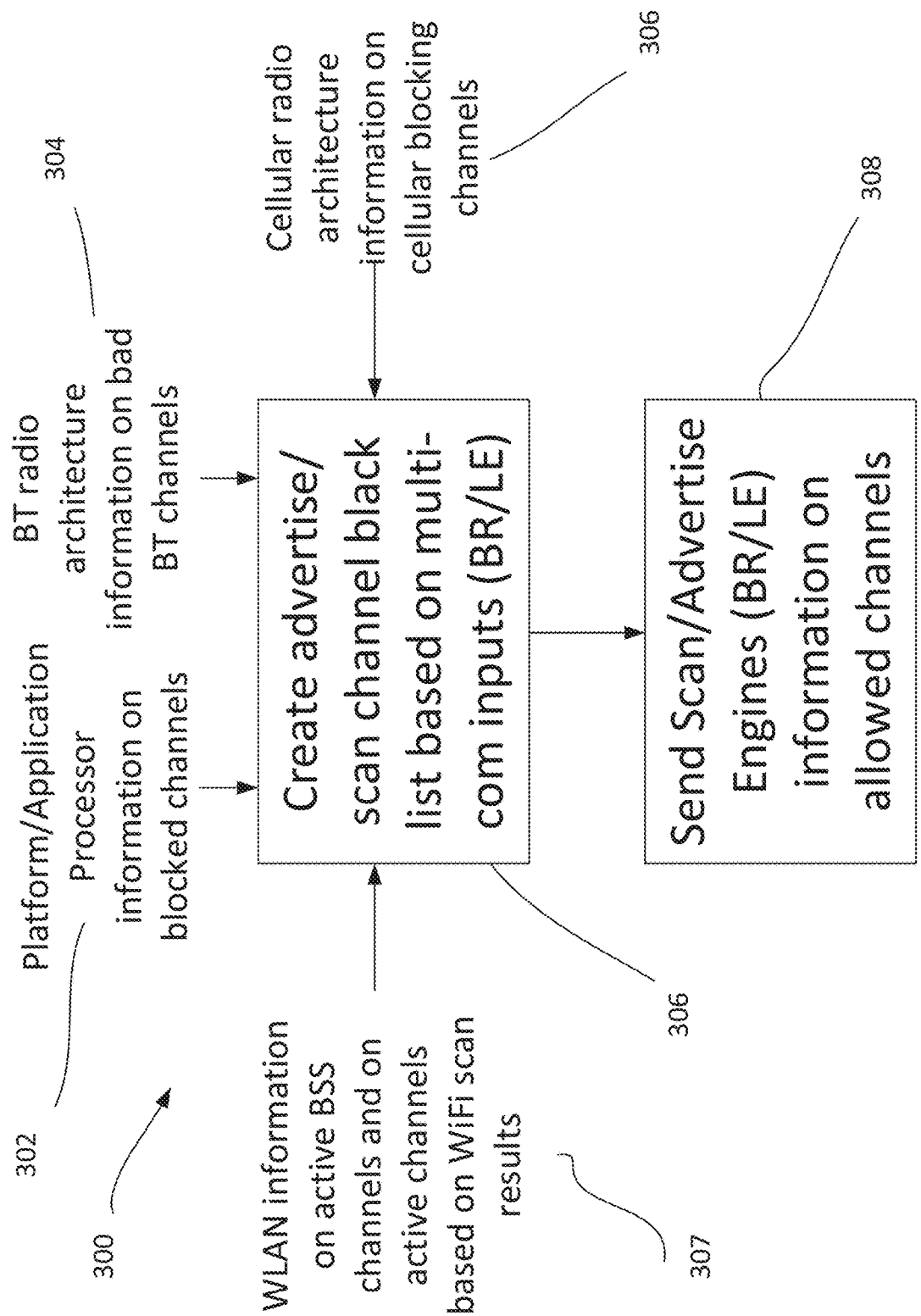
FIG. 3 shows an example process according to one embodiment.

Reference will now be made to FIGS. 1, 2, and 3 in order to describe some demonstrative embodiments, although it is to be noted that embodiments are not limited to what is described below and shown with respect to FIG. 1, or 2, or 3, or any of the other figures included herein.

Referring now to FIGS. 1, 2 and 3, a wireless communication device of a wireless system, such as, for example, BT baseband processing circuitry 208b of STA 200, including memory 209b and processor 210b and control logic within the processor 210b, is to: use the processor 210b to process information from a controller device, such as controller device 221 of FIG. 2, regarding contaminated channels to be avoided during a discovery procedure. The processor is further to perform the discovery procedure by causing transmission of advertising packets or by causing scanning for advertising packets on channels not including the contaminated channels based on the information from the controller device. The wireless system being a first wireless communication device, the processor is further to cause a wireless connection between the first wireless system and a second wireless system based on the discovery procedure, the discovery procedure and the wireless connection being in compliance with a wireless communication protocol, such as with BT.

Referring still to FIGS. 1, 2, and 3, an apparatus of a wireless system, such as controller device 221 of a STA 200, may include an input I; an output O as seen in FIG. 2; and processing circuitry connected to the input and to the output, the processing circuitry to implement logic to receive, through the input and from a first modem of the wireless system, such as, for example, through the WiFi baseband processing circuitry 208a, information on a traffic attribute relating to communication in compliance with a first wireless communication protocol, such as information on WiFi communication. The apparatus, such as controller device 221 is to determine, based on the traffic attribute, contaminated channels to be avoided during a discovery procedure by a second modem, such as by BT baseband processing circuitry 208b of the wireless system or STA 200, the discovery being in compliance with a second wireless communication protocol, such as with BT. The apparatus, such as controller device 221, may send, through its output, information based on the contaminated channels to the second modem, such as to the BT baseband processing circuitry 208b, to cause the second modem to avoid the contaminated channels during the discovery procedure.

Referring in particular to FIG. 2, the BT baseband processing circuitry 208b may process information from a controller device 221, such as a controller processing circuitry within the application processor 211, or such as a controller processing circuitry that is distinct from the application processor 211 (not shown), the information including contaminated channels, that is, a list of channels to be avoided when performing BT discovery procedures. The BT baseband processing circuitry can then use this information to actively avoid the channels on the blacklist, in this way contributing to advantageously shortening BT discovery times.

Information may be sent from the controller device to the BT processing circuitry by way of an inter-chip or intra-chip interface, and may be based on not only the wireless traffic to and from STA 200, but also based on the traffic in the network 100 within which STA 200 may be situated, where the network supports not only BT communications, but also communications based on other potentially interfering wireless communication protocols, such as WiFi and/or cellular wireless communication protocols. Each of the radio architectures compliant with each potentially interfering wireless communication protocol (i.e. a wireless communication protocol that has the potential to interfere with the frequency hopping wireless communication protocol, such as BT—e.g. WiFi and/or cellular communications on the 2.4 GHz frequency bands), may be used to determine whether energy exists in the network on the air interface corresponding to said each potentially interfering wireless protocol, and to send information to the controller device of STA 200 based on that determination. As noted previously, the energy thus sensed may be energy corresponding to direct communication with STA 200, or it may be energy correspond to communications happening in the vicinity of STA 200, such as WiFi communication 109 and/or cellular communication 110 with STA 108 of FIG. 1 (noting that, in the instant description, we are assuming that STA 200 corresponds to STA 12 in FIG. 1). The information sent to the controller device may be based on whether wireless traffic is close and active.

The information to controller device 221 may include information from each modem compliant with a potentially interfering wireless communication protocol, for example from the WiFi baseband processing circuitry 208a and/or from the cellular baseband processing circuitry 223, the information being sent over control pathways within STA 200 to the controller device 221 through on-device inter-chip or intra-chip physical pathways as shown by way of arrows from baseband processing circuitries 208a and 223 to the application processor 211 where the controller device 221 is shown to reside in the shown embodiment of FIG. 2. The information to controller device 221 from each of the baseband processing circuitries 208a and/or 223 may for example include traffic attributes including a list of frequencies or channels used by the given baseband processing circuitry, percent occupancy or activity ratio of the noted frequencies or channels, such as percent of time that each of the noted frequencies or channels are occupied, and a ratio of transmit power to receive power, to name a few. For example, the cellular baseband processing circuitry 223 may send information to controller device 221 including a list of channels (blocking channels) used for cellular traffic, for example as sensed by the STA 200, a percentage of time that the noted channels are occupied, and power levels measured in those channels. In addition, and again by way of example, the WiFi baseband processing circuitry 208a may send WiFi traffic attributes to controller device 221 including a list of channels used for WiFi traffic, for example as sensed via scanning by STA 200, a percentage of time that the noted channels are occupied, and power levels measured on those channels. By way of example, a cellular modem may send information to a controller device including information that it is using channels 70-83, that on average those channels are occupied 30% of the time, and that the average power level on those channel is about −80 dBm/Hz. In addition, a WiFi modem may send WiFi traffic attributes to a controller device including information that it is using channels 6-8, that on average those channels are occupied 50% of the time, and that the average power level on those channels is about 20 dBm/Hz, with dBm to denote decibel-milliwatt.

The controller device 221 may include logic to implement an algorithm that determines a blacklist of channels or frequencies for the BT baseband processing circuitry, and that thereafter causes the information regarding the blacklist of channels to be sent to the BT baseband processing circuitry to allow the BT wireless system to avoid the contaminated channels during a discovery procedure (that is, during the advertise and scan procedure described above). The logic may take all traffic attributes sent to it by the potentially interfering modems, and may determine the contaminated channels based on the attributes. For example, the logic may assign weights, priorities or scores to each attribute of the traffic attributes, or to the wireless protocol being used for the traffic or communication, and may make a determination regarding the list based on those scores.

In addition to the traffic attributes from the modems compliant with potentially interfering wireless communication protocols, such as from the WiFi baseband processing circuitry 208a and from the cellular baseband processing circuitry 223, the BT modem, such as the BT baseband processing circuitry 208b, may make its own measurements to determine which channels are actually experiencing interference. For example, channels that have experienced communication errors within a given time period may be contaminated by the BT baseband processing circuitry autonomously, and this information may be sent to the controller device 221 as well, for example through inter-chip or intra-chip signaling paths.

In addition to the above, the application processor 211 or host may also send information to the controller device 221 regarding prohibited channels through inter-chip or intra-chip communication paths. By way of example, a component on the STA 200, such as memory 215, storage unit 217, or a memory on the application processor 211, or any other memory on STA 200, may store information regarding host-identified prohibited channels which may have been, by way of example, identified during product manufacturing or testing.

All of the above-noted information, including information on the traffic attributes, on the BT identified prohibited channels, and on the host identified prohibited channels may be sent to the controller device and used by the logic/algorithm of the controller device to decide which channels are to be contaminated by the BT modem for discovery. The algorithm being used by the controller device may be implemented to periodically refresh the data set used to determine the blacklist of channels. According to one embodiment, the algorithm or logic may be implemented by the controller device 221 to send information regarding contaminated channels to the BT modem in a periodic manner (either at random time intervals, or at predetermined time intervals that are constant or variable, or both). Therefore, according to one embodiment, the information regarding the contaminated channels may be intermittently, periodically routed to the controller device, and therefore not necessarily in real-time. For example, the contaminated channels may be refreshed by the algorithm every 100 second or 100 milliseconds. The refresh frequency of the contaminated channels may be chosen to have minimal impact on the power draw on STA 200.

The algorithm or logic may be implemented to apply a score to each channel, to each traffic attribute, and/or to each wireless communication protocol corresponding to the channel. The scores per channel, per traffic attribute, or per wireless communication protocol, may be stored in memory, for example in lookup tables. The memory may include memory 215, storage unit 217, or a memory on the application processor 211, or any other memory on STA 200, may store information regarding prohibited channels. For example, the algorithm may assume a predetermined score for a given wireless communication protocol (e.g. WiFi or cellular), and it may further employ a predetermined score as a function of each of the following: power (e.g. average power level, ratio to transmit power to receive power, or any other power metric regarding the traffic), occupation (e.g. percentage of time channel is occupied). The scores may be stored in memory. The logic or algorithm may then be implemented to determine the contaminated channels based on a predetermined number of topmost scored channels, based on channels with scores above a predetermined threshold, or on based on scores above a predetermined threshold with an additional condition of not having less than a predetermined number of channels. In this respect, given that BLE has only 3 channels, where BLE is being used, the channel scores would have to be relatively low as compared with all available channel scores (say, in the bottom third of possible scores) for a channel to be contaminated. The latter is to ensure that the BT discovery procedure is still robust in the face of the channel blacklisting procedures described by way of example above. Not too many BT channels so BT becomes less robust.

Today, the BT specifications either suggest a relatively strict requirement to scan/advertise on all frequencies (for example, in classic BT or Basic Rate (BR), where advertising packets are sent on all frequencies with a prescribed hopping order) or suggest a more loose definition to scan all frequencies (for example, in BLE, where it is up to the scanner to select which frequencies to scan within each scan window and where the hopping order is implementation specific), but there is no reference or requirement to optimize the channels used for scanning based on a-priori knowledge regarding the channels.

The ability to avoid frequencies which are blocked for scan and use only good frequencies will speed up BT connection time. By way of example, a calculation of the expected reduction in connection time for a classic BT (BR) scanner device would take into consideration that each BR inquiry contain 16 frequencies spread over the 2.4 GHz ISM spectrum (as opposed to 3 frequencies or channels for BLE). For a WiFi use case where channel 6 at 20 MHz has active traffic, about 25% of the 16 BR channels would suffer from high error rates as a result of the WiFi traffic (since the 20 MHz would cover about 4 of the BR frequency bands), and, if we were to assume aggressive WiFi activity, we could assume a 50% rate of collisions. Given that each inquiry or scan window for BR is 1.28 seconds, if the current inquiry window misses the advertising packet, the wireless system would need to wait for the next inquiry window of 1.28 seconds. As a result, on average, the wireless system may be blind for an entire scan window of 1.28 seconds for the given percentage of connection trials, that is, at a 50% collision rate, for about 50%*0.25=12.5%, meaning that, on average, in about 12.5% of BT connection trials, the connection duration would have been doubled. Using a flow according to proposed embodiments, the BT wireless system will establish a BT connection with the advertiser in a first interval of inquiry.

FIG. 3 is a schematic representation of a process 300 of aggregating information from various sources in order to determine a list of contaminated channels. In FIG. 3, blocks 306 and 308 correspond to processes to take place within a controller device, such as controller device 221 of FIG. 2 as described above. Blocks 302, 304, 306, 307 correspond to inputs, respectively, from the application processor 211 on host-identified prohibited channels, from the BT radio architecture on BT identified prohibited channels, from the cellular radio architecture on cellular blocking channels, and from the WiFi radio architecture on active Basic Service Set (BSS) channels and on active channels based on WiFi scan results. At block 306, the creation of the blacklist of channels based on the multi-com input (input from modems compliant with various wireless communication systems) may be based on any version of BT, including for example classic BT (BR) and BLE. At block 308, the controller device is to send the information on the blacklist or on allowed channels to the scan and/or advertise engines of the BT modem, such as the scan and/or advertise engines of the BT baseband processing circuitry 208b of FIG. 2, to allow the scan and/or advertise engines to scan or advertise only on non-contaminated channels and to avoid the contaminated channels.

Figure 4:
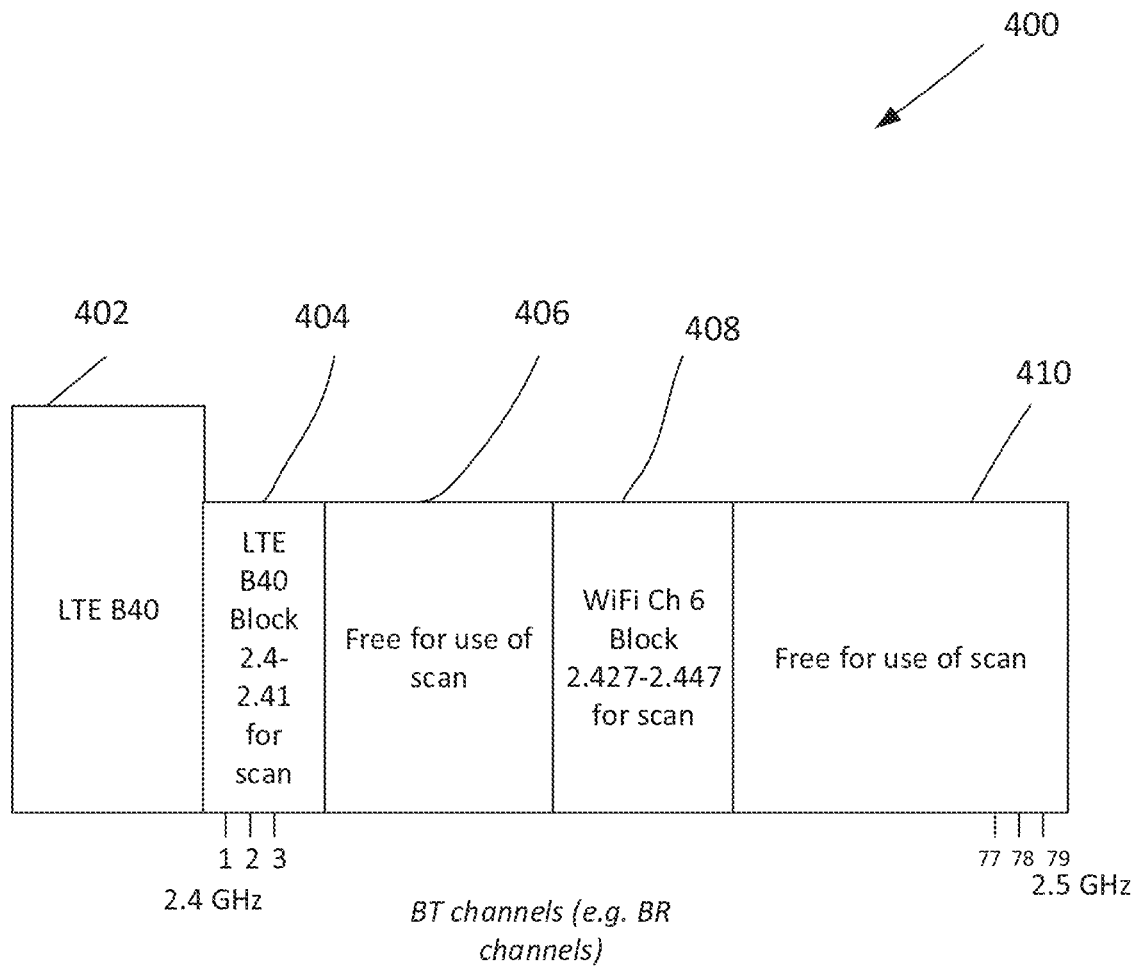
FIG. 4 is a graph showing channels including blacklisted channels for Bluetooth discovery according to an example embodiment.

Reference is now made to FIG. 4, which shows a graph 400 with the frequency domain on the horizontal axis showing BT channels, such as BR channels, between the 2.4 GHz and 2.5 GHz frequency band starting at channel 1 and running through channel 79. As seen in graph 400, where a LTE channel B40 just below the 2.4 GHz frequency is occupied with LTE traffic at 402, its energy can spill over into neighboring or adjacent channels in the 2.4 to 2.41 GHz bands as shown by block 404, block 404 residing in the advertise or scan channels for BR. In block 404, 10 BT channels are shown as experiencing the spillover because of power from out of band transmission of LTE transmitter. The spillover may take place for example especially where the LTE transmitters may be using ineffective/less expensive filters. Graph 400 shows the channels between 2.41 GHz and 2.427 at block 406 are free channels to be used by the BT modem for advertising or scanning. At block 408, the WiFi channel 6 between 2.427 and 2.447 GHz is shown as being occupied by WiFi traffic, and the BT channels corresponding to WiFi channel 6 would also be contaminated, along with BT channels 1-10 by virtue of the LTE spillover from B40. Again, graph 400 shows the channels between 2.447 GHz and 2.5 GHz at block 410 are free channels to be used by the BT modem for advertising or scanning In the scenario of FIG. 4, the LTE modem would provide input regarding traffic attributes of the LTE traffic to the relevant controller device, such as controller device 221 of FIG. 2, and the WiFi modem would do the same for WiFi traffic. The controller device having received the LTE modem and WiFi modem input, and possibly input from the BT modem and from the application processor as well, and would process such information to generate a blacklist of channels that would include the channels in blocks 404 and 408 of FIG. 4.

According to an alternative environment, the WiFi modem and/or cellular modem could provide information to the controller device regarding a timing of expected traffic within their respective protocols. For example, the cellular modem could provide information to the controller device about slots scheduled by a base station, such as base station 105 in FIG. 1, and the WiFi modem could provide information to the controller device about uplink communications scheduled by an AP, such as AP 106 in FIG. 1, via a trigger frame in a 802.11ax network. The controller device could process such timing information, and could send to the BT modem information based on which the BT modem could organize or order its frequency hopping pattern based on expected interfering traffic.

Figure 5:
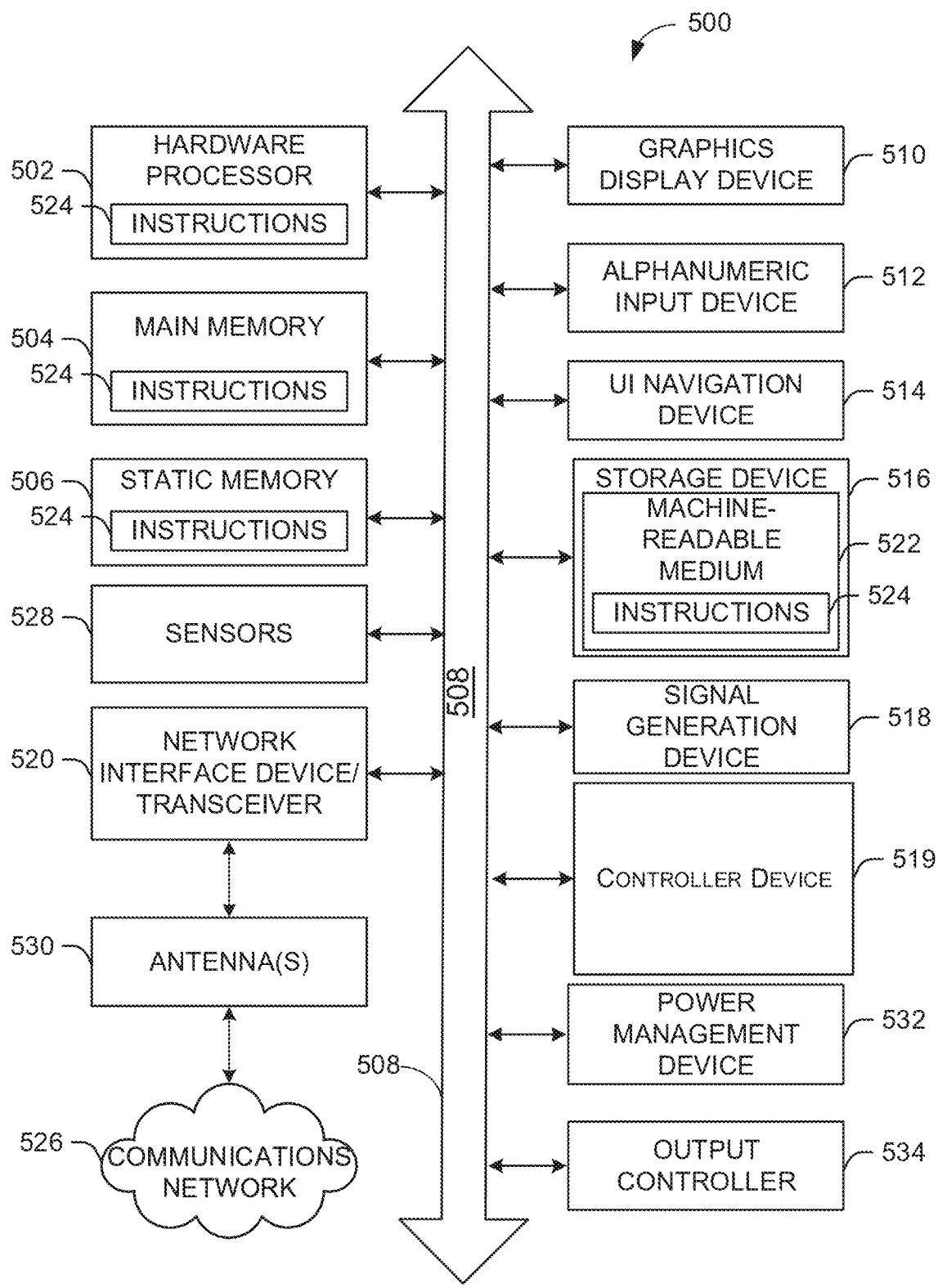
FIG. 5 illustrates a block diagram of an example of a machine or system upon which any one or more of the techniques according to embodiment may be performed.

FIG. 5 illustrates a block diagram of an example of a machine 500 or system upon which any one or more of the techniques (e.g., methodologies) discussed herein may be performed. In other embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environments. The machine 500 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a power management device 532, a graphics display device 510, an alphanumeric input device 512 (e.g., a keyboard), and a user interface (UI) navigation device 514 (e.g., a mouse). In an example, the graphics display device 510, alphanumeric input device 512, and UI navigation device 514 may be a touch screen display. The machine 500 may additionally include a storage device (i.e., drive unit) 516, a signal generation device 518 (e.g., a speaker), a controller device 519, a network interface device/transceiver 520 coupled to antenna(s) 530, and one or more sensors 528, such as a global positioning system (GPS) sensor, a compass, an accelerometer, or other sensor. The machine 500 may include an output controller 534, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 516 may constitute machine-readable media.

The controller device 519 may carry out or perform any of the operations and processes (e.g., process 600) described and shown below.

It is understood that the above are only a subset of what the controller device 519 may be configured to perform and that other functions included throughout this disclosure may also be performed by the controller device 519.

While the machine-readable medium 522 is illustrated as a single medium, the term "machine-readable medium" may include a single medium or multiple media (e.g., a centralized or distributed database, and/or associated caches and servers) configured to store the one or more instructions 524.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc. The computer-readable medium may further be intangible, and/or it may be transitory, according to some embodiments.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device/transceiver 520 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 520 may include one or more physical jacks (e.g., Ethernet, coaxial, or phone jacks) or one or more antennas to connect to the communications network 526. In an example, the network interface device/transceiver 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 6:
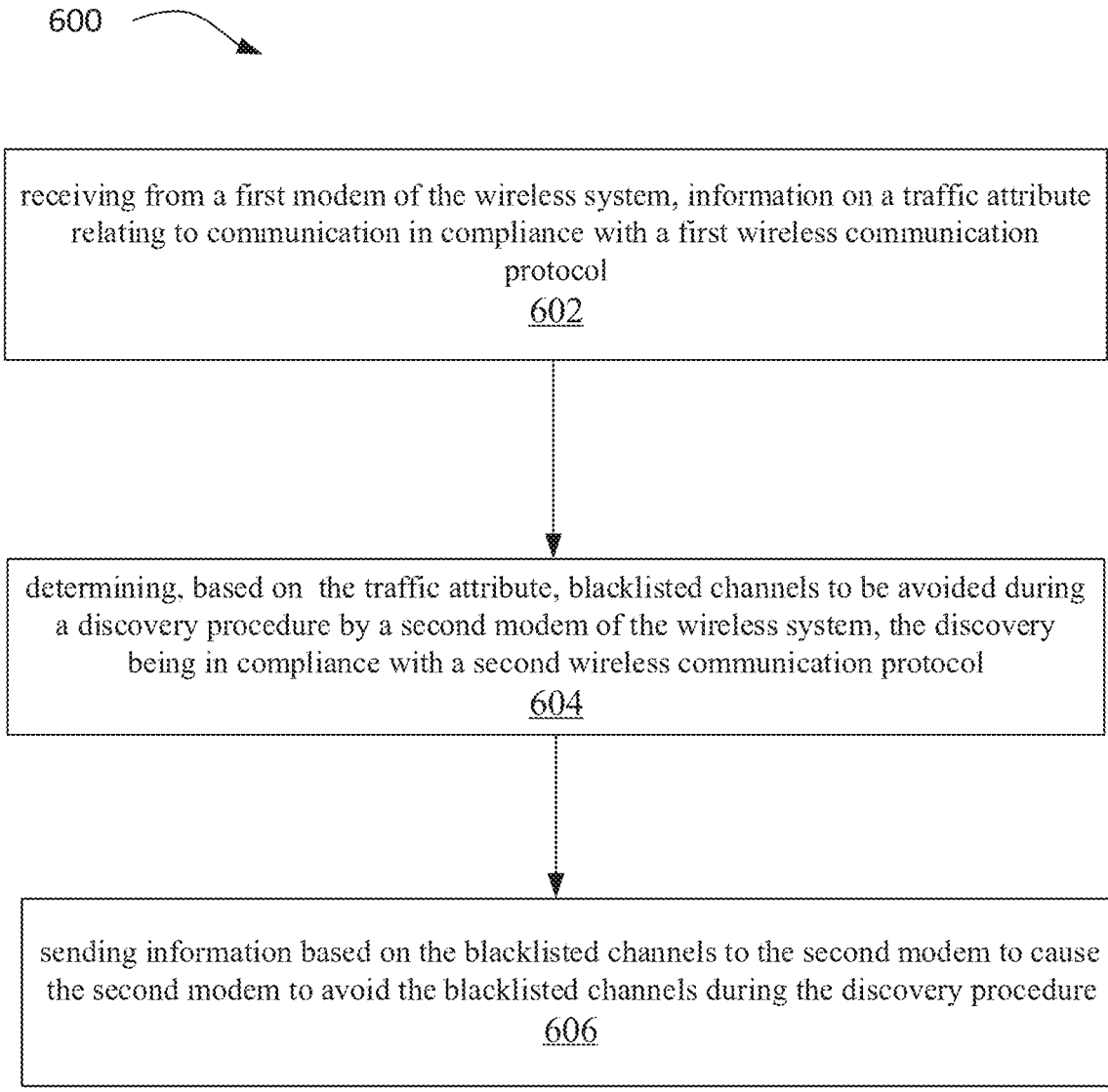
FIG. 6 is a flow diagram showing an example process for determining provision of location services for a cluster according to one embodiment.

FIG. 6 shows a flow diagram of an example process 600 according to embodiments. At operation 602, the process includes receiving from a first modem of the wireless system, information on a traffic attribute relating to communication in compliance with a first wireless communication protocol; At operation 604, the process includes determining, based on the traffic attribute, contaminated channels to be avoided during a discovery procedure by a second modem of the wireless system, the discovery being in compliance with a second wireless communication protocol. At operation 606, the process includes sending information based on the contaminated channels to the second modem to cause the second modem to avoid the contaminated channels during the discovery procedure.

Functions, operations, components and/or features described herein with reference to one or more embodiments, may be combined with, or may be utilized in combination with, one or more other functions, operations, components and/or features described herein with reference to one or more other embodiments, or vice versa.

EXAMPLES

The following examples pertain to further embodiments. It will be understood that certain examples listed below may be combined with other examples, or certain aspects of other examples.

Example 1 includes an apparatus of a wireless system, the apparatus including an input; an output; and processing circuitry connected to the input and to the output, the processing circuitry to implement logic to: receive, through the input and from a first modem of the wireless system, information on a traffic attribute relating to communication in compliance with a first wireless communication protocol; determine, based on the traffic attribute, contaminated channels to be avoided during a discovery procedure by a second modem of the wireless system, the discovery being in compliance with a second wireless communication protocol; and send, through the output, information based on the contaminated channels to the second modem to cause the second modem to avoid the contaminated channels during the discovery procedure.

Example 2 includes the subject matter of Example 1, and optionally, wherein the traffic attribute includes a plurality of traffic attributes, the first modem includes a plurality of first modems, the first wireless communication protocol includes a plurality of first wireless communication protocols, and the communication associated with the traffic attribute includes a plurality of communications each corresponding to a set of the plurality of traffic attributes, to a respective one of the plurality of first wireless communication protocols, and to a respective one of the plurality of first modems.

Example 3 includes the subject matter of Example 2, and optionally, wherein the plurality of first wireless communication protocols include a WiFi wireless communication protocol and a cellular wireless communication protocol, and the second wireless communication protocol includes a Bluetooth wireless communication protocol.

Example 4 includes the subject matter of Example 2, and optionally, wherein the traffic attributes for each of the communications include at least one of: a list of channels used for said each of the communications, a percentage of time that the channels in the list of channels are occupied, and a power level measured on the channels in the list of channels.

Example 5 includes the subject matter of Example 2, and optionally, wherein the processing circuitry is further to: receive, through the input, at least one of information on prohibited channels from an application processor of the wireless system, or information on prohibited channels from the second modem; and determine the contaminated channels based on at least one of the information on prohibited channels from the application processor or the information on prohibited channels from the second modem.

Example 6 includes the subject matter of Example 1, and optionally, wherein the processing circuitry is to: receive, through the input and from the first modem, information regarding a transmission schedule for the communication; and send, through the output, information based on the transmission schedule to the second modem to cause the second modem to perform the discovery procedure based on the transmission schedule.

Example 7 includes the subject matter of Example 5, and optionally, wherein the processing circuitry is further to: assign a score to at least one of: each of the traffic attributes, the information on prohibited channels from the application processor, the information on prohibited channels from the second modem or each of the plurality of first wireless communication protocols; and determine the contaminated channels based on the score.

Example 8 includes the subject matter of Example 7, and optionally, further including a memory to store the score, the memory coupled to the processing circuitry.

Example 9 includes the subject matter of Example 8, and optionally, further including a radio integrated circuit connected to the first modem, a front-end module connected to the radio integrated circuit, and one or more antennas coupled to the front-end module to communicate in compliance with the first wireless communication protocol.

Example 10 includes a product comprising one or more tangible computer-readable non-transitory storage media comprising computer-executable instructions operable to, when executed by at least one computer processor of a wireless system, enable the at least one computer processor to implement operations, the operations comprising: receiving from a first modem of the wireless system, information on a traffic attribute relating to communication in compliance with a first wireless communication protocol; determining, based on the traffic attribute, contaminated channels to be avoided during a discovery procedure by a second modem of the wireless system, the discovery being in compliance with a second wireless communication protocol; and sending information based on the contaminated channels to the second modem to cause the second modem to avoid the contaminated channels during the discovery procedure.

Example 11 includes the subject matter of Example 10, and optionally, wherein the traffic attribute includes a plurality of traffic attributes, the first modem includes a plurality of first modems, the first wireless communication protocol includes a plurality of first wireless communication protocols, and the communication associated with the traffic attribute includes a plurality of communications each corresponding to a set of the plurality of traffic attributes, to a respective one of the plurality of first wireless communication protocols, and to a respective one of the plurality of first modems.

Example 12 includes the subject matter of claim 11, and optionally, wherein the plurality of first wireless communication protocols include a WiFi wireless communication protocol and a cellular wireless communication protocol, and the second wireless communication protocol includes a Bluetooth wireless communication protocol.

Example 13 includes the subject matter of Example 11, and optionally, wherein the traffic attributes for each of the communications include at least one of: a list of channels used for said each of the communications, a percentage of time that the channels in the list of channels are occupied, and a power level measured on the channels in the list of channels.

Example 14 includes the subject matter of Example 11, and optionally, wherein the operations further include: receiving at least one of information on prohibited channels from an application processor of the wireless system, or information on prohibited channels from the second modem; and determining the contaminated channels based on at least one of the information on prohibited channels from the application processor or the information on prohibited channels from the second modem.

Example 15 includes the subject matter of Example 10, and optionally, wherein the operations further include: receiving from the first modem, information regarding a transmission schedule for the communication; and sending information based on the transmission schedule to the second modem to cause the second modem to perform the discovery procedure based on the transmission schedule.

Example 16 includes the subject matter of Example 14, and optionally, wherein the operations further include: assigning a score to at least one of: each of the traffic attributes, the information on prohibited channels from the application processor, the information on prohibited channels from the second modem or each of the plurality of first wireless communication protocols; and determining the contaminated channels based on the score.

Example 17 includes a method to be performed by an apparatus of a wireless system, the method including: receiving, from a first modem of the wireless system, information on a traffic attribute relating to communication in compliance with a first wireless communication protocol; determining, based on the traffic attribute, contaminated channels to be avoided during a discovery procedure by a second modem of the wireless system, the discovery being in compliance with a second wireless communication protocol; and sending information based on the contaminated channels to the second modem to cause the second modem to avoid the contaminated channels during the discovery procedure.

Example 18 includes the subject matter of Example 17, and optionally, wherein the traffic attribute includes a plurality of traffic attributes, the first modem includes a plurality of first modems, the first wireless communication protocol includes a plurality of first wireless communication protocols, and the communication associated with the traffic attribute includes a plurality of communications each corresponding to a set of the plurality of traffic attributes, to a respective one of the plurality of first wireless communication protocols, and to a respective one of the plurality of first modems.

Example 19 includes the subject matter of Example 18, and optionally, wherein the plurality of first wireless communication protocols include a WiFi wireless communication protocol and a cellular wireless communication protocol, and the second wireless communication protocol includes a Bluetooth wireless communication protocol.

Example 20 includes the subject matter of Example 18, and optionally, wherein the traffic attributes for each of the communications include at least one of: a list of channels used for said each of the communications, a percentage of time that the channels in the list of channels are occupied, and a power level measured on the channels in the list of channels.

Example 21 includes the subject matter of Example 18, and optionally, further comprising: receiving at least one of information on prohibited channels from an application processor of the wireless system, or information on prohibited channels from the second modem; and determining the contaminated channels based on at least one of the information on prohibited channels from the application processor or the information on prohibited channels from the second modem.

Example 22 includes the subject matter of Example 17, and optionally, further comprising: receiving, from the first modem, information regarding a transmission schedule for the communication; and sending information based on the transmission schedule to the second modem to cause the second modem to perform the discovery procedure based on the transmission schedule.

Example 23 includes the subject matter of Example 21, and optionally, further including: assigning a score to at least one of: each of the traffic attributes, the information on prohibited channels from the application processor, the information on prohibited channels from the second modem or each of the plurality of first wireless communication protocols; and determining the contaminated channels based on the score.

Example 24 includes an apparatus of a wireless system, the apparatus including: means for receiving from a first modem of the wireless system, information on a traffic attribute relating to communication in compliance with a first wireless communication protocol; means for determining, based on the traffic attribute, contaminated channels to be avoided during a discovery procedure by a second modem of the wireless system, the discovery being in compliance with a second wireless communication protocol; and means for sending information based on the contaminated channels to the second modem to cause the second modem to avoid the contaminated channels during the discovery procedure.

Example 25 includes the subject matter of Example 24, and optionally, wherein the traffic attribute includes a plurality of traffic attributes, the first modem includes a plurality of first modems, the first wireless communication protocol includes a plurality of first wireless communication protocols, and the communication associated with the traffic attribute includes a plurality of communications each corresponding to a set of the plurality of traffic attributes, to a respective one of the plurality of first wireless communication protocols, and to a respective one of the plurality of first modems.

Example 26 includes a wireless communication device of a wireless system, the device comprising a memory, and a processing circuitry coupled to the memory and including logic, the processing circuitry to: process information from a controller device of the wireless system regarding contaminated channels to be avoided during a discovery procedure; and perform the discovery procedure by causing transmission of advertising packets or by causing scanning for advertising packets on channels not including the contaminated channels based on the information from the controller device, wherein: the wireless system is a first wireless communication device, the processing circuitry further to cause a wireless connection between the first wireless system and a second wireless system based on the discovery procedure; and the discovery procedure and the wireless connection are in compliance with a wireless communication protocol.

Example 27 includes the subject matter of Example 26, and optionally, wherein the wireless communication protocol is a first wireless communication protocol, and wherein the contaminated channels are based on at least one of: traffic attributes regarding communications in compliance with at least one second wireless communication protocol, channels prohibited by the wireless communication device or channels prohibited by an application processor of the wireless system.

Example 28 includes the subject matter of Example 27, and optionally, wherein the processing circuitry is to receive, through the input, a transmission schedule for the communications in compliance with the at least one second wireless communication protocol, and to perform the discovery procedure by selecting an order for discovery channels based on the schedule.

Example 29 includes the subject matter of Example 27, and optionally, wherein the first wireless communication protocol is a Bluetooth wireless communication protocol, and the at least one second wireless communication protocol includes at least one of a WiFi wireless communication protocol or a cellular wireless communication protocol.

Example 30 includes the subject matter of Example 27, and optionally, wherein the processing circuitry is further to process information from the controller device regarding a transmission schedule for the communications in compliance with the at least one second wireless communication protocol, and to perform the discovery procedure by selecting an order for discovery channels based on the schedule.

Example 31 includes the subject matter of Example 26, and optionally, the processing circuitry to receive the information via an input to be connected to one or more physical pathways to the controller device.

Example 32 includes the subject matter of Example 26, and optionally, further including a radio integrated circuit, and a front-end module coupled to the radio integrated circuit.

Example 33 includes the subject matter of Example 32, and optionally, further including one or more antennas coupled to the front-end module.

Example 34 includes a product comprising one or more tangible computer-readable non-transitory storage media comprising computer-executable instructions operable to, when executed by at least one computer processor of a wireless system, enable the at least one computer processor to implement operations comprising: processing information from a controller device of the wireless system regarding contaminated channels to be avoided during a discovery procedure; and performing the discovery procedure by causing transmission of advertising packets or by causing scanning for advertising packets on channels not including the contaminated channels based on the information from the controller device, wherein: the wireless system is a first wireless communication device, the processing circuitry further to cause a wireless connection between the first wireless system and a second wireless system based on the discovery procedure; and the discovery procedure and the wireless connection are in compliance with a wireless communication protocol.

Example 35 includes the subject matter of Example 34, and optionally, wherein the wireless communication protocol is a first wireless communication protocol, and wherein the contaminated channels are based on at least one of: traffic attributes regarding communications in compliance with at least one second wireless communication protocol, channels prohibited by the wireless communication device or channels prohibited by an application processor of the wireless system.

Example 36 includes the subject matter of Example 35, and optionally, wherein the operations further including receiving, through the input, a transmission schedule for the communications in compliance with the at least one second wireless communication protocol, and performing the discovery procedure by selecting an order for discovery channels based on the schedule.

Example 37 includes the subject matter of Example 35, and optionally, wherein the first wireless communication protocol is a Bluetooth wireless communication protocol, and the at least one second wireless communication protocol includes at least one of a WiFi wireless communication protocol or a cellular wireless communication protocol.

Example 38 includes the subject matter of Example 35, and optionally, wherein the operations further include processing information from the controller device regarding a transmission schedule for the communications in compliance with the at least one second wireless communication protocol, and to perform the discovery procedure by selecting an order for discovery channels based on the schedule.

Example 39 includes the subject matter of Example 34, and optionally, wherein the operations further including receiving the information via an input to be connected to one or more physical pathways to the controller device.

Example 40 includes a method to be performed by a wireless communication device of a wireless system, the method comprising: processing information from a controller device of the wireless system regarding contaminated channels to be avoided during a discovery procedure; and performing the discovery procedure by causing transmission of advertising packets or by causing scanning for advertising packets on channels not including the contaminated channels based on the information from the controller device, wherein: the wireless system is a first wireless communication device, the processing circuitry further to cause a wireless connection between the first wireless system and a second wireless system based on the discovery procedure; and the discovery procedure and the wireless connection are in compliance with a wireless communication protocol.

Example 41 includes the subject matter of Example 40, and optionally, wherein the wireless communication protocol is a first wireless communication protocol, and wherein the contaminated channels are based on at least one of: traffic attributes regarding communications in compliance with at least one second wireless communication protocol, channels prohibited by the wireless communication device or channels prohibited by an application processor of the wireless system.

Example 42 includes the subject matter of Example 41, and optionally, further comprising receiving, through the input, a transmission schedule for the communications in compliance with the at least one second wireless communication protocol, and to perform the discovery procedure by selecting an order for discovery channels based on the schedule.

Example 43 includes the subject matter of Example 41, and optionally, wherein the first wireless communication protocol is a Bluetooth wireless communication protocol, and the at least one second wireless communication protocol includes at least one of a WiFi wireless communication protocol or a cellular wireless communication protocol.

Example 44 includes the subject matter of Example 41, and optionally, further including processing information from the controller device regarding a transmission schedule for the communications in compliance with the at least one second wireless communication protocol, and performing the discovery procedure by selecting an order for discovery channels based on the schedule.

Example 45 includes the subject matter of Example 40, and optionally, further including receiving the information via an input to be connected to one or more physical pathways to the controller device.

Example 46 includes a wireless communication device of a wireless system comprising: means for processing information from a controller device of the wireless system regarding contaminated channels to be avoided during a discovery procedure; and means for performing the discovery procedure by causing transmission of advertising packets or by causing scanning for advertising packets on channels not including the contaminated channels based on the information from the controller device, wherein: the wireless system is a first wireless communication device, the processing circuitry further to cause a wireless connection between the first wireless system and a second wireless system based on the discovery procedure; and the discovery procedure and the wireless connection are in compliance with a wireless communication protocol.

Example 47 includes the subject matter of Example 46, and optionally, wherein the wireless communication protocol is a first wireless communication protocol, and wherein the contaminated channels are based on at least one of: traffic attributes regarding communications in compliance with at least one second wireless communication protocol, channels prohibited by the wireless communication device or channels prohibited by an application processor of the wireless system.

Example 48 includes the subject matter of Example 47, and optionally, further comprising means for receiving, through the input, a transmission schedule for the communications in compliance with the at least one second wireless communication protocol, and means for performing the discovery procedure by selecting an order for discovery channels based on the schedule.

Example 49 includes the subject matter of Example 47, and optionally, wherein the first wireless communication protocol is a Bluetooth wireless communication protocol, and the at least one second wireless communication protocol includes at least one of a WiFi wireless communication protocol or a cellular wireless communication protocol.

Example 50 includes the subject matter of Example 47, and optionally, further including means for processing information from the controller device regarding a transmission schedule for the communications in compliance with the at least one second wireless communication protocol, and means for performing the discovery procedure by selecting an order for discovery channels based on the schedule.

Example 51 includes the subject matter of Example 46, and optionally, further including means for receiving the information via an input to be connected to one or more physical pathways to the controller device.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus of a wireless device, the apparatus including:
   an input;
   an output; and
   processing circuitry physically coupled to the input and to the output, the processing circuitry to implement logic to:
     determine, based on a traffic attribute relating to a communication in compliance with a first wireless communication protocol, contaminated channels to be avoided during a discovery procedure by the wireless device in compliance with a second wireless communication protocol; and
     cause the wireless device to:
       avoid the contaminated channels during the discovery procedure; and
       perform the discovery procedure by advertising or scanning based on a transmission schedule for the communication.

2. The apparatus of claim 1, wherein a first modem of the wireless device is to cause the communication, the processing circuitry further to:
   receive, through the input, information regarding the traffic attribute;
   cause the wireless device to avoid the contaminated channels during the discovery procedure by sending information, through the output, regarding the contaminated channels to a second modem of the wireless device to cause the second modem to avoid the contaminated channels during the discovery procedure; and
   cause the wireless device to perform the discovery procedure by advertising or scanning based on the transmission schedule by sending information, through the output, regarding the transmission schedule to the second modem to cause the second modem to advertise or scan as part of the discovery procedure based on the transmission schedule.

3. The apparatus of claim 2, wherein the traffic attribute includes a plurality of traffic attributes, the first wireless communication protocol includes a plurality of first wireless communication protocols, and the communication associated with the traffic attribute includes a plurality of communications each corresponding to a set of the plurality of traffic attributes, to a respective one of the plurality of first wireless communication protocols.

4. The apparatus of claim 3, wherein the plurality of first wireless communication protocols include a WiFi wireless communication protocol and a cellular wireless communication protocol, and the second wireless communication protocol includes a Bluetooth wireless communication protocol.

5. The apparatus of claim 3, wherein the traffic attributes for each of the communications include at least one of: a list of channels used for said each of the communications, a percentage of time that the channels in the list of channels are occupied, or a power level measured on the channels in the list of channels.

6. The apparatus of claim 3, wherein the processing circuitry is further to:
   receive, through the input, at least one of information regarding prohibited channels from an application processor of the wireless device, or information regarding prohibited channels from the second modem; and
   determine the contaminated channels based on the prohibited channels.

7. The apparatus of claim 6, wherein the processing circuitry is further to:
   assign a score to at least one of: each of the traffic attributes, the prohibited channels, or each of the plurality of first wireless communication protocols; and
   determine the contaminated channels based on the score.

8. The apparatus of claim 7, further including a memory to store the score, the memory coupled to the processing circuitry.

9. A product comprising one or more tangible computer-readable non-transitory storage media comprising computer-executable instructions operable to, when executed by at least one processor of a wireless device, cause the at least one processor to implement operations at the wireless device, the operations comprising:
   determining, based on a traffic attribute relating to a communication in compliance with a first wireless communication protocol, contaminated channels to be avoided during a discovery procedure by the wireless device in compliance with a second wireless communication protocol; and
   causing the wireless device to:
     avoid the contaminated channels during the discovery procedure; and
     perform the discovery procedure by advertising or scanning based on a transmission schedule for the communication.

10. The product of claim 9, wherein a first modem of the wireless device is to cause the communication, the operations further including:
    receiving information regarding the traffic attribute;
    causing the wireless device to avoid the contaminated channels during the discovery procedure by sending information regarding the contaminated channels to a second modem of the wireless device to cause the second modem to avoid the contaminated channels during the discovery procedure; and causing the wireless device to perform the discovery procedure by advertising or scanning based on the transmission schedule by sending information regarding the transmission schedule to the second modem to cause the second modem to advertise or scan as part of the discovery procedure based on the transmission schedule.

11. The product of claim 10, wherein the traffic attribute includes a plurality of traffic attributes, the first wireless communication protocol includes a plurality of first wireless communication protocols, and the communication associated with the traffic attribute includes a plurality of communications each corresponding to a set of the plurality of traffic attributes, to a respective one of the plurality of first wireless communication protocols.

12. The product of claim 11, wherein the plurality of first wireless communication protocols include a WiFi wireless communication protocol and a cellular wireless communication protocol, and the second wireless communication protocol includes a Bluetooth wireless communication protocol.

13. The product of claim 11, wherein the traffic attributes for each of the communications include at least one of: a list of channels used for said each of the communications, a percentage of time that the channels in the list of channels are occupied, or a power level measured on the channels in the list of channels.

14. The product of claim 11, wherein the operations further include:
receiving at least one of information regarding prohibited channels from an application processor of the wireless device, or information regarding prohibited channels from the second modem; and
determining the contaminated channels based on the prohibited channels.

15. The product of claim 14, wherein the operations further include:
assigning a score to at least one of: each of the traffic attributes, the prohibited channels, or each of the plurality of first wireless communication protocols; and
determining the contaminated channels based on the score.

16. The product of claim 15, the operations further include storing the score in a memory of the wireless device.

17. A method to be performed by at least one computer processor of a wireless device, the method including:
determining, based on a traffic attribute relating to a communication in compliance with a first wireless communication protocol, contaminated channels to be avoided during a discovery procedure by the wireless device in compliance with a second wireless communication protocol; and
causing the wireless device to:
avoid the contaminated channels during the discovery procedure; and
perform the discovery procedure by advertising or scanning based on a transmission schedule for the communication.

18. The method of claim 17, wherein a first modem of the wireless device is to cause the communication, the method further including:
receiving information regarding the traffic attribute;
causing the wireless device to avoid the contaminated channels during the discovery procedure by sending information regarding the contaminated channels to a second modem of the wireless device to cause the second modem to avoid the contaminated channels during the discovery procedure; and
causing the wireless device to perform the discovery procedure by advertising or scanning based on the transmission schedule by sending information regarding the transmission schedule to the second modem to cause the second modem to advertise or scan as part of the discovery procedure based on the transmission schedule.

19. The method of claim 18, wherein the traffic attribute includes a plurality of traffic attributes, the first wireless communication protocol includes a plurality of first wireless communication protocols, and the communication associated with the traffic attribute includes a plurality of communications each corresponding to a set of the plurality of traffic attributes, to a respective one of the plurality of first wireless communication protocols.

20. The method of claim 19, wherein the plurality of first wireless communication protocols include a WiFi wireless communication protocol and a cellular wireless communication protocol, and the second wireless communication protocol includes a Bluetooth wireless communication protocol.

21. The method of claim 19, wherein the traffic attributes for each of the communications include at least one of: a list of channels used for said each of the communications, a percentage of time that the channels in the list of channels are occupied, or a power level measured on the channels in the list of channels.

22. The method of claim 19, wherein the method further includes:
receiving at least one of information regarding prohibited channels from an application processor of the wireless device, or information regarding prohibited channels from the second modem; and
determining the contaminated channels based on the prohibited channels.

23. The method of claim 22, wherein the method further includes:
assigning a score to at least one of: each of the traffic attributes, the prohibited channels, or each of the plurality of first wireless communication protocols; and
determining the contaminated channels based on the score.

24. An apparatus of a wireless device, the apparatus including:
means for determining, based on a traffic attribute relating to a communication in compliance with a first wireless communication protocol, contaminated channels to be avoided during a discovery procedure by the wireless device in compliance with a second wireless communication protocol; and
means for causing the wireless device to:
avoid the contaminated channels during the discovery procedure; and
perform the discovery procedure by advertising or scanning based on a transmission schedule for the communication.

25. The apparatus of claim 24, wherein a first modem of the wireless device is to cause the communication, the apparatus further including:
means for receiving information regarding the traffic attribute;
means for causing the wireless device to avoid the contaminated channels during the discovery procedure by sending information regarding the contaminated channels to a second modem of the wireless device to cause the second modem to avoid the contaminated channels during the discovery procedure; and means for causing the wireless device to perform the discovery procedure by advertising or scanning based on the transmission schedule by sending information regarding the transmission schedule to the second modem to cause the second modem to advertise or scan as part of the discovery procedure based on the transmission schedule.

* * * * *